UNITED STATES PATENT OFFICE.

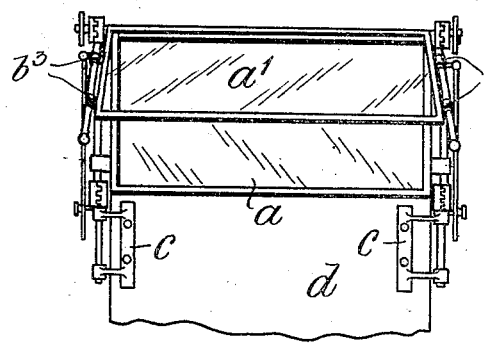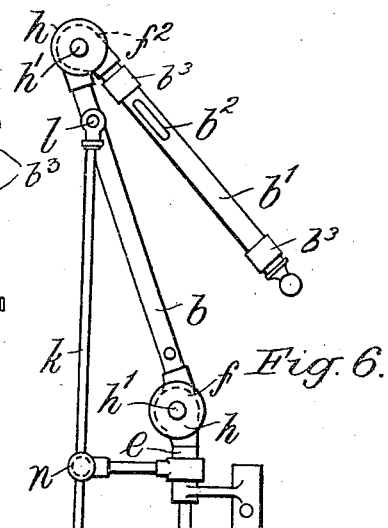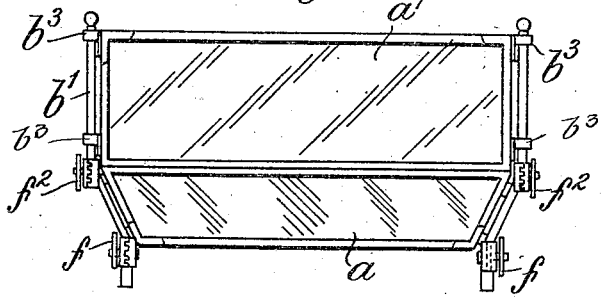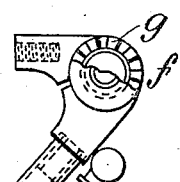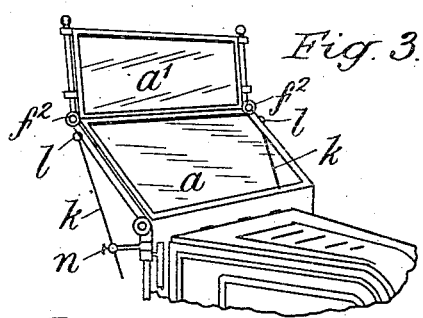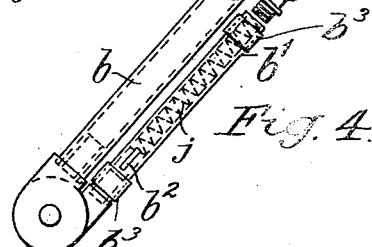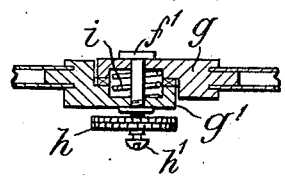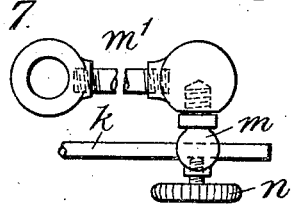

OSCAR T. BANKS, OF LONDON, ENGLAND.

GUARD OR SCREEN FOR MOTOR ROAD-VEHICLES.

No. 910,772.  Specification of Letters Patent.  Patented Jan. 26, 1909.

Application filed November 14, 1907. Serial No. 402,142.

*To all whom it may concern:*

Be it known that I, OSCAR THOMAS BANKS, a subject of the King of Great Britain and Ireland, residing at 49 Mortimer street, London, W., England, have invented certain new and useful Improvements in Guards or Screens for Motor Road-Vehicles; and I do hereby declare the following to be a full, clear, and exact description of the invention, such as will enable others skilled in the art to which it appertains to make and use the same.

This invention for improvements in guards or screens for motor road vehicles relates to wind, dust and like screens which are formed of two or more parts adjustably connected together and capable of being fixed at various angles to each other to suit different conditions of wind or weather, or folded out of the way when not in use, and has for its object to facilitate the adjustment of guards or screens of the type referred to and to insure that the contiguous edges of the relatively adjustable parts of the guard or screen shall be kept close together irrespective of the angle of adjustment.

According to this invention both parts of the screen can be adjusted to any desired angle and also the parts of the screen are kept in close contact at their meeting edges by springs, one or more of the parts being mounted to slide relatively to the other part or parts to enable the necessary adjustment to be effected.

In one way of carrying the invention into practical effect I form the screen proper in two parts one or both of which are glazed in the known manner, and one of which is mounted above the other. The lower part is pivotally mounted on the dash-board, while the upper part is mounted to slide on tubular pillars or rods pivotally connected with the end framing of the lower part. Springs are located in the hollow guide pillars and bear on suitable projections on the ends of the upper half of the screen, which pass through slots in the pillars. By the action of the springs the lower edge of the upper or sliding half of the screen is kept in contact with the upper edge of the lower half so that wind or rain cannot penetrate between the parts. At the same time the springs allow the upper part to slide on its guides as the angle between the meeting edges of the screen halves varies with the adjustment of the screen. Alternatively the adjoining edges of the screens may be arranged to form a knuckle joint in which case the axes of the pivots must be in line with the axis of the joint.

The adjustment and fixing of the parts after adjustment is effected by forming the cheeks of the pivots with series of opposed teeth adapted to be forced into engagement by screw nuts to lock the cheeks together after adjustment. The cheeks are hollow and form a box for the reception of a spring that tends to force the teeth out of engagement, so that by loosening the fixing nuts of both pivots, the screen can be adjusted. The teeth of the pivots at opposite sides of the screen are so arranged that the disengagement is effected by a lateral sliding motion of the upper pivoted part of the screen, under the action of the springs. When folded or unfolded the screen is tightly held by the clamping nuts and no shaking or rattling of the parts can take place. It is necessary to slacken both nuts before the screen can be turned about its pivot. Suitable stays or struts are pivoted to the screen and slide in a guide pivoted on an arm projecting from the screen support and provided with means for clamping the stay.

In the accompanying drawings, Figure 1 is a front elevation of a screen constructed according to this invention, showing the upper half folded down, Fig. 2 is a rear elevation of the screen showing the upper half vertical and the lower half inclined. Fig. 3 is a perspective view, Figs. 4 and 5 are detail views, and Fig. 6 is a side elevation of a jointed screen support. Fig. 7 is a detail view.

The screen comprises the two glazed frames $a$ $a'$ mounted on the jointed side pillars or supports $b$ $b'$ which are connected to brackets $c$ on the dash-board $d$ by screw threaded sockets $e$. As shown the lower part $a$ of the screen is mounted so that it can be adjusted at any suitable angle in relation to the dash-board. For this purpose the pillars or rods $b$ forming the end framing of the lower part $a$ of the screen are connected with the socket pieces $e$ by a pivot joint $f$ having toothed cheeks $g$ $g'$ formed respectively on the socket pieces $e$ and the rods $b$ and capable of being forced into engagement to lock the cheeks together after adjustment, by milled nuts $h$ screwing on the outer ends of the pivot bolts $f'$. The nuts $h$ are prevented from being turned entirely off the bolts by small headed screws $h'$ with reverse threads.

Between the cheeks $g$ $g'$ which are recessed on the inside a spring $i$ is inserted which tends to force the cheeks apart when the nut $h$ is loosened thus putting the teeth out of engagement and allowing the screen to be adjusted. The pillars or rods $b'$ on which the upper frame $a'$ of the screen is mounted are connected to the lower rods by joints $f^2$ similar to the joints $f$ which serve for the adjustment of the lower part of the screen, so that the upper part can be adjusted and fixed after adjustment in a precisely similar manner to the lower part.

Within the pillars $b'$ which are hollow, springs $j$ are located which bear on projections or pins in the ends of the frame $a'$ that pass through slots $b^2$ in the pillars $b'$. The frame $a'$ is capable of sliding on the pillars $b'$ being connected thereto by guide lugs or eyes $b^3$. By the action of the springs $j$ the lower edge of the upper part $a'$ of the screen is kept in contact with the adjacent edge of the lower part $a$ of the screen whatever the angle of adjustment may be between the two parts $a\ a'$. Stay rods $k$ are pivotally connected to the pillars or rods $b$ at $l$ and pass through guides $m$ Fig. 7 mounted to turn freely in arms or brackets $m'$ on the socket pieces $e$. The rods $k$ can readily follow the movement of the part $a$ of the screen during the adjustment and are fixed when the screen is adjusted by clamping screws $n$ screwing in the guides $m$. It will be seen that the stay rods $k$ are entirely guided and supported on the screen fittings, but if desired stays connected to any convenient part of the car may be employed. When adjusting a part of the screen both clamping nuts holding the toothed cheeks together must be slackened to allow the teeth of the corresponding pivot joints to be moved out of engagement by their springs. The screen can then be adjusted and fixed in the adjusted position by screwing up the clamping nut on one side after which the clamping nut on the other side is tightened up.

What I claim and desire to secure by Letters Patent is:—

1. A guard or screen for vehicles comprising a plurality of members, means for fixing said members at various angles relatively to each other and spring means carried by one of the members for forcing said members together to provide a tight joint at the contiguous edges thereof at all times.

2. A guard or screen for vehicles comprising two members adjustable at various angles relatively to each other, one member being slidable relatively to the other, and spring means for forcing said sliding member against the other member to provide a tight joint at the contiguous edges thereof.

3. A folding screen for motor road vehicles comprising jointed end pillars or supports, a lower glazed frame fixed in the end supports, an upper glazed frame mounted to slide on the end supports, and springs in the end supports arranged to act on the sliding upper frame to maintain the lower edge thereof close against the adjacent edge of the lower frame substantially as described.

In testimony whereof I have affixed my signature, in presence of two witnesses.

OSCAR T. BANKS.

Witnesses:
H. D. JAMESON,
F. L. RAND.